United States Patent [19]
Lai et al.

[11] Patent Number: 5,306,358
[45] Date of Patent: Apr. 26, 1994

[54] SHIELDING GAS TO REDUCE WELD HOT CRACKING

[75] Inventors: George Y. Lai, Carmel; Robert B. H. Herchenroeder, Kokomo, both of Ind.; Christopher R. Patriarca, Ruston, La.

[73] Assignee: Haynes International, Inc., Kokomo, Ind.

[21] Appl. No.: 747,558

[22] Filed: Aug. 20, 1991

[51] Int. Cl.5 .............................................. C22C 19/05
[52] U.S. Cl. ..................................... 148/427; 219/72; 219/74; 228/219; 420/590; 423/351
[58] Field of Search ..................... 148/427; 228/219; 219/74, 72; 423/351; 420/590, 442, 441

[56] References Cited
U.S. PATENT DOCUMENTS 2,602,871  7/1952  Noland et al. ...................... 219/72
5,083,002  1/1992  Hoback et al. ..................... 219/74

OTHER PUBLICATIONS

*Metals Handbook*, 9th Ed., vol. 6: Welding, Brazing, and Soldering, pp. 163, 164, 436, 438, and 439; American Society for Metals (1983).

M. J. Cieslak, et al., "A Study of the Weldability and Weld Related Microstructure of Cabot Alloy 214", *Metallurgical Transactions A*, vol. 19A (Mar. 1988), pp. 657 to 667.

*Primary Examiner*—R. Dean
*Assistant Examiner*—Robert R. Koehler
*Attorney, Agent, or Firm*—R. Steven Linne

[57] ABSTRACT

An inert gas nitrogen mixture is used as a shielding gas to prevent weld hot cracking in superalloys containing zirconium and/or boron. The gas mixture preferably contains argon and about 2 to 8% by volume nitrogen. Test data show excellent results are obtained when gas tungsten arc welding HAYNES 214 alloy which normally contains boron and zirconium and a minimal content of titanium.

7 Claims, 1 Drawing Sheet

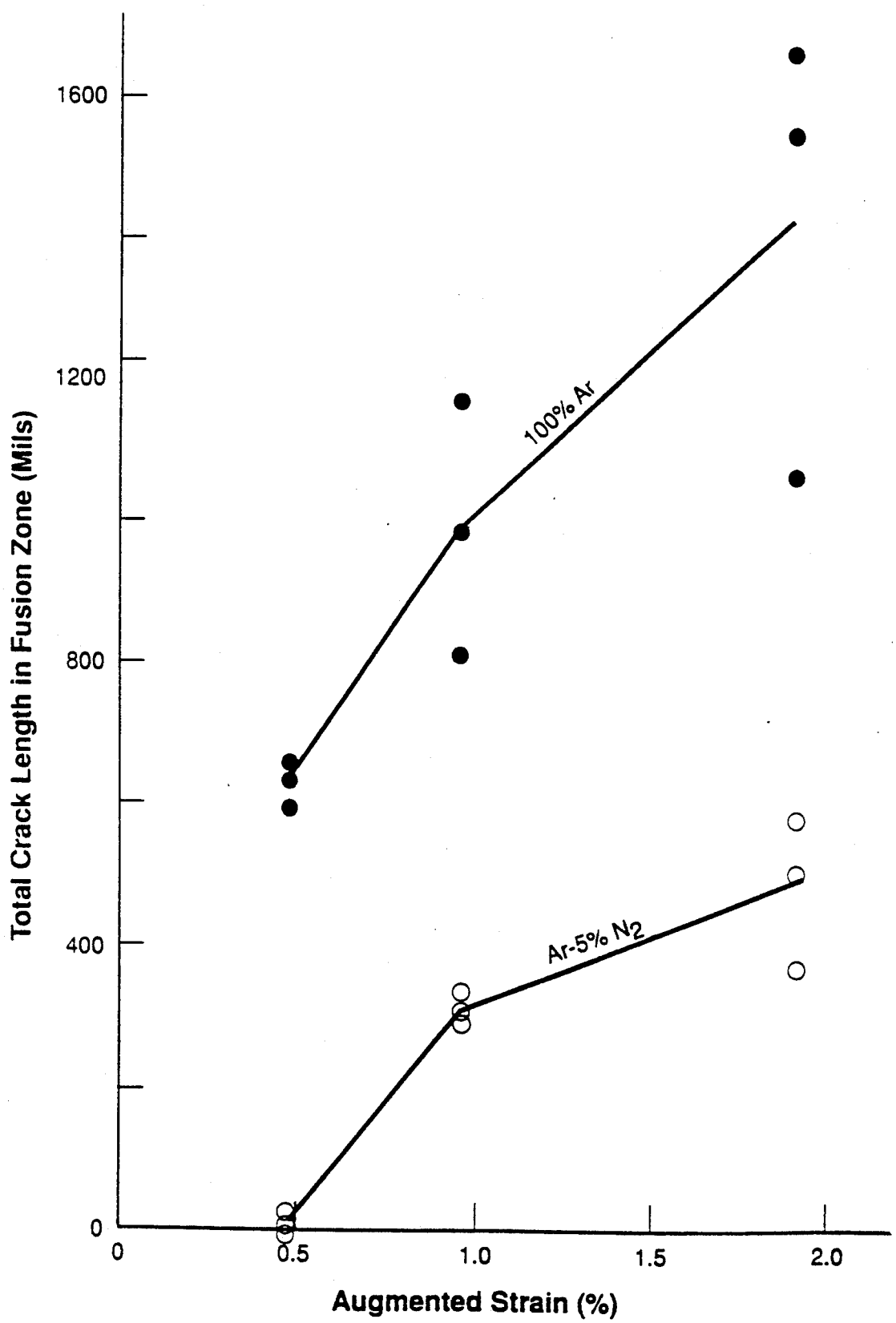

SHIELDING GAS TO REDUCE WELD HOT CRACKING

FIELD OF THE INVENTION

This invention relates generally to the welding of superalloys with the use of a shielding gas. More specifically, it relates to a critically controlled shielding gas composition that reduces (or eliminates) weld hot cracking in gamma prime or solution strengthened nickel-base superalloys.

BACKGROUND OF THE INVENTION

In the production of superalloys (nickel, cobalt and-/or iron base) many benefits are obtained with the addition of a small content of boron and/or zirconium, for example, to reduce strain-aging cracking problems. It is also known in the art that these elements, at certain content levels, may be harmful in products in the welded form. U.K. Patent Application No. GB 2,183,675-A discloses among other features, the elimination of zirconium from the well-known WASPALOY alloy to improve weldability of cast products. U.S. Pat. No. 4,787,945 teaches the criticality and interdependence between zirconium and nitrogen contents in the composition of certain alloys. The two elements must be present "to effect grain size control" of the alloy.

An article entitled "A Study of the Weldability and Weld-Related Microstructure of CABOT alloy 214," by M. J. Cieslak, et al, in *Metallurgical Transactions*, Volume 19A, March 1988, discuses the harmful effects of boron and zirconium when welding a nickel-base alloy now known as HAYNES 214 alloy. HAYNES is a registered trademark of Haynes International, Inc., the assignee of the present invention.

U.S. Pat. No. 4,671,931 relates to a nickel-base alloy containing iron, chromium and aluminum. This patent constitutes an improvement over the alloys as defined in U.S. Pat. Nos. 4,460,542 and 4,312,682 known as NICR-ALY alloys generally containing boron and/or zirconium. These alloys, including HAYNES 214 alloy, may contain titanium as an optional element.

U.S. Pat. No. 1,746,209 relates to the use of a hydrogen-nitrogen mixture as a welding shield in electric arc welding. Ammonia is disclosed as a possible source of the H—N mixture. The use of mixed gases in this patent provides improved characteristics of the welding arc. Only a scant mention is made of a "nickel-chromium alloy" being welded. There is no mention of boron or zirconium in the patent.

The addition of nitrogen to metals and alloys has been well-known in the art for many years: for example, U.S. Pat. No. 2,069,204; U.S. Pat. No. 2,537,103; No. 4,588,450 and U.S. Pat. No. 4,619,692. These references relate to the melting and production of alloys or the addition of nitrogen to an alloy in solid state.

The use of nitrogen in welding Types 304 and 316 steel was disclosed in an article "Influence of Nitrogen Addition on Microstructure and Pitting Corrosion Resistance of Austenitic Weld Metal," by Kamachi Mudali, et al, in *Werkstoffe un Korrosion* (Materials and Corrosion), Vol. 37:12, pp 637-643 December 1986. The article was reported in *Current Awareness Bulletin* of the Materials and Ceramics Information Center at Battelle Columbus Division, Issue No. 167, June 1987. The article relates to the structure and pitting corrosion properties specifically of Types 304 and 316 stainless steels that normally do not contain boron or zirconium.

The prior art tends to suggest that there is a need for the beneficial effects of boron and zirconium but there is a problem with harmful effects of boron and zirconium in welded alloy products. The combined teachings of these disclosures do not suggest a solution to the problem of weld hot cracking of superalloys containing boron and/or zirconium.

It is therefore an object of this invention to provide a welding process that reduces, or eliminates, weld hot cracking in the welding of superalloys.

It is another object of this invention to provide such benefits through the use of a new shielding gas composition.

Other objects, features, and advantages of the present invention may be discerned by people skilled in the art from the following description of a presently preferred embodiment.

SUMMARY OF THE INVENTION

The objects stated above are obtained by the provision of a novel inert gas and nitrogen mixture as the shielding gas during the welding of boron-and/or zirconium-containing superalloys. Although the exact mechanism is not completely understood, it is believed the nitrogen ties up the boron and zirconium in a manner to render them harmless in superalloys. It appears the boron and zirconium are combined with the nitrogen thereby forming products (for example, complex B and/or Zr nitrides) that do not promote weld hot cracking. Boron and/or zirconium when present in superalloys tend to promote weld hot cracking during welding as described in the references mentioned above. For the purposes of this invention, superalloys may be broadly defined as shown in Table 1. Superalloys are most often cobalt or nickel-base and containing chromium; the total of these three elements comprise over 50 weight percent of the alloy. Further, in the following discussion, compositions of gas mixes are given in volume percent, abbreviated as Vol/o.

Welding of component parts may be done by a variety of methods that use a heat source, for example, gas metal arc welding (GMAW), gas tungsten arc welding (GTAW), plasma arc welding (PAW) and the like. Each of these methods usually require an inert gas (e.g. argon) as a means for shielding the metal during the welding step. Although the experimental examples described herein were gas tungsten arc welded, it is expected that similar shielding may be provided to other welding processes. Therefore, other welding methods that require a shielding gas are included within the scope of this invention.

It is understood that the effective gas in the mixture is nitrogen. Argon is the preferred inert gas because of the cost difference between argon and other inert gases, such as helium. Thus, for the purposes of this invention, any other inert gas or combination of inert gases may be substituted as an equivalent of argon. Other gases may be present for purposes known in the art, for example, oxygen, carbon dioxide and other active gases.

BRIEF DESCRIPTION OF THE DRAWING

The sole FIGURE is a graphic comparison of test data using the gas mixture of this invention or a common prior art shielding gas.

DESCRIPTION OF THE PREFERRED EMBODIMENT

A series of varestraint tests were run experimentally to establish the extent of the invention. The varestraint test is known in the art and described in the "Welding Research Council Bulletin," Bulletin No. 280 August, 1982.

EXAMPLE 1

A series of varestraint tests was performed using ⅜-inch thick 214 TM plate. Products bearing the 214 trademark are manufactured by Haynes International, Inc. from certain Ni-Cr-Al-Fe superalloys as discussed earlier. The plate was welded autogeneously by gas tungsten arc welding process. The welding parameters were: 250 Amps., 0.090 inch arc length (cold), with a gas flow rate at 35 cfh, using one of two shielding gases (1) 100% Ar or (2) 95% Ar-5% $N_2$. Table 2 shows test result data.

The advantages of this invention are clearly shown in the resultant data in Table 2. The weld hot cracking in the examples with an Ar-$N_2$ mixture shielding gas was substantially reduced when compared with examples with commercially pure argon shielding gas.

EXAMPLE 2

In another series of tests, 0.360 inch thick 214 plate was autogeneously welded as in Example 1 and tested. The total crack length was obtained from the fusion zone and the heat-affected zone. Here, also the advantages of the Ar-$N_2$ mixture shielding gas are clearly shown in Table 3. Note that improvement is made at each of the strain levels tested. These data are dramatically shown in the FIGURE.

EXAMPLE 3

In still another series of tests, 214 sheet (0.085 inch thick) was autogeneously welded as in Example 1, except for the range of 28 to 30 amps, and varestraint tested. The test results are given in Table 4. The data show that both the number of cracks and the total length of cracks were dramatically reduced (some actually eliminated) when the mixed Ar-5% $N_2$ shielding gas of this invention was used. Note, for example, at more severe conditions (2.43 and 1.70% augmented strain), welds made under the shielding gas of this invention were superior to welds made under less severe conditions (1.06% augmented strain) under the prior art commercial argon.

Cursory experimentations were conducted on a variety of alloys using the argon-5% nitrogen mixture. The alloys included well-known gamma-prime type alloys including the following:

WASPALOY = Ni + 19.5 Cr + 13.5 Co + 4.3 Mo + 3 Ti + 0.006 B + 0.05 Z    1

X-750 alloy = Ni + 15.5 Cr + 1 Cb + 0.7 Al + 2.5 Ti + 7 Fe    2

263 alloy = Ni + 20 Cr + 20 Co + 5 Mo + 0.45 Al + 2.15 Ti + 0.001 B + 0.02 Zr    3

718 alloy = Ni + 19 Cr + 3 Mo + 5 Cb + 0.05 Al + 0.9 Ti + 19 Fe    4

R-41 alloy = Ni + 19 Cr + 11 Co + 10 Mo + 1.5 Al + 3.1 Ti + 0.005 B    5

The resulting welds had a low quality appearance due to the formation of a thick gold-bronze colored surface scale and poor surface contour. (Alloy 718 may be an exception with a bright gold color and good surface contour.) The welds with the poorest appearance were in those alloys with the highest titanium contents compared to those with relatively lower titanium. It is suspected that the dissociation of the nitrogen gas in the welding arc (plasma condition) results in the formation of titanium nitride. This is consistent with the gold-bronze colored appearance. Therefore, the titanium content of alloys welded with this gas should be on the low side, preferably less than about 1.0% for best results.

The composition of the Argon-5% nitrogen mixture as used in the experimental studies appears to be most effective in obtaining good results. It is expected that a fairly wide range of nitrogen content may be also effective; however, nitrogen should not exceed the argon content to avoid excessive nitriding of other elements which may be harmful in certain properties. Thus, in most conditions, the nitrogen content should not exceed about 25% with the balance argon plus impurities. Preferably, the nitrogen content may be about 2 to 8 percent by volume. However, a minimal small, but effective, content of nitrogen is essentially required; for example, at least about 0.5% in some cases.

The exact proportions of argon and nitrogen may be determined under specific conditions by operations skilled in the art. Variables include one or more of (1) composition of alloy that is welded, (2) welding parameters (amps, arc length, rate of gas flow, etc.), and (3) size and type of welding equipment and the like. Adjustments to obtain optimum argon-nitrogen ratios may be readily made with commercial gas mixing and gas flow systems.

It will be apparent to those skilled in the art that the novel principles of the invention disclosed herein, in connection with specific examples thereof, will support various other modifications and applications of the same. For example, as stated above, it is expected that similar results will be obtained with other methods of welding where gas shielding is required. It is accordingly desired that, in construing the breadth of the appended claims, they shall not be limited to the specific examples of the invention described herein.

TABLE 1

ALLOYS BENEFITED BY THIS INVENTION
Chemical Composition, in Weight Percent

|  | Broad | Intermediate | Preferred | Typical | Examples 1 and 3 | Example 2 |
|---|---|---|---|---|---|---|
| Cr | 8-22 | 10-20 | 14-18 | 16 | 16.01 | 15.84 |
| Mo + W | up to 20 | up to 15 | 15 max | 15 max | 1 max | 1 max |
| Al | up to 6 | 1-6 | 4-6 | 4.5 | 4.48 | 4.29 |
| Ti | up to 1.0 | .5 max | .2 max. | .1 max | .1 max | .1 max |
| Ta, Cb, Mn, Si | up to 8 | up to 5 | 3 max. | 3 max | 1 max | 1 max |

TABLE 1-continued

ALLOYS BENEFITED BY THIS INVENTION
Chemical Composition, in Weight Percent

|   | Broad | Intermediate | Preferred | Typical | Examples 1 and 3 | Example 2 |
|---|---|---|---|---|---|---|
| B | up to .05 | .001–.03 | .03 max. | .02 max | .002 | .004 |
| Zr | up to 3 | .005–.2 | .005–.2 | .1 max | .06 | .03 |
| B + Zr | .005 Min. | .005 Min. | .005 min. | .005 min. | .062 | .034 |
| R—E | up to .5 | up to .3 | .04 max | .01 max | .02 max | .01 max |
| Cobalt | up to 40 | up to 30 | 30 max | 30 max | 1 max | 1 max |
| Yttrium | up to .1 | up to .1 | up to .05 | .005 | .005 | .005 |
| Iron | up to 36 | up to 10 | 1.5–8 | 30 max | 2.43 | 3.43 |
| Carbon | up to .5 | up to .1 | .01–.10 | .05 | .04 | .03 |
| Nickel | Bal. | Bal. | Bal. | Bal. | Bal. | Bal. |

R—E = Rare Earths plus lanthanum
Bal. = Balance plus impurities

TABLE 2

VARESTRAINT TEST DATA FOR ⅜" THICK PLATE WELDED WITH AND WITHOUT NITROGEN ADDITIONS

| Shielding Gas | Augmented Strain (%) | Number of Cracks* | Total Cracks Length* (mils) |
|---|---|---|---|
| Prior Art | | | |
| 100% Ar | 1 | 23 | 1258 |
| " | 1 | 24 | 1204 |
| " | 1 | 19 | 1141 |
| " | 2 | 25 | 1482 |
| " | 2 | 17 | 1056 |
| " | 2 | 26 | 1567 |
| This Invention | | | |
| Ar-5% $N_2$ | 1 | 4 | 44 |
| " | 1 | 4 | 36 |
| " | 1 | 6 | 42 |
| " | 2 | 12 | 118 |
| " | 2 | 22 | 194 |
| " | 2 | 34 | 278 |

*Fusion Zone Only

TABLE 3

VARESTRAINT TEST DATA FOR .360" THICK 214 PLATE WELDED WITH AND WITHOUT NITROGEN ADDITIONS

| Shielding Gas | Augmented Strain (%) | Total Crack Length (mils) In Fusion Zone | In Heat Affected Zone |
|---|---|---|---|
| Prior Art | | | |
| 100% Ar | 0.48 | 595 | 23 |
| " | " | 636 | 12 |
| " | " | 663 | 0 |
| " | 0.96 | 818 | 43 |
| " | " | 1177 | 43 |
| " | " | 993 | 18 |
| " | 1.91 | 1554 | 179 |
| " | " | 1667 | 146 |
| " | " | 1071 | 172 |
| This Invention | | | |
| Ar-5% $N_2$ | 0.48 | 0 | 16 |
| " | " | 33 | 5 |
| " | " | 10 | 0 |
| " | 0.96 | 342 | 14 |
| " | " | 308 | 9 |
| " | " | 298 | 0 |
| " | 1.91 | 374 | 52 |
| " | " | 585 | 38 |
| " | " | 510 | 47 |

TABLE 4

SUBSCALE VARESTRAINT DATA FOR .085" ALLOY SHEET WELDED WITH AND WITHOUT NITROGEN ADDITIONS

| Shielding Gas | Augmented strain (%) | Number of Cracks* | Total Cracks Length* (mils) |
|---|---|---|---|
| Ar-5% $N_2$** | 2.43 | 1 | 13 |
| Ar-5% $N_2$** | 1.70 | 0 | 0 |
| 100% Ar | 1.06 | 4 | 72 |
| 100% Ar | " | 6 | 78 |
| 100% Ar | " | 5 | 88 |
| 100% Ar | " | 2 | 26 |
| 100% Ar | " | 5 | 65 |
| 100% Ar | " | 3 | 29 |
| Ar-5% $N_2$** | " | 0 | 0 |

*Fusion Zone Only
**This Invention

What is claimed is:

1. A process for the welding of nickel base superalloys containing zirconium and/or boron by a welding method requiring gas shielding, wherein the shielding gas consists essentially of about 2 to 8 percent by volume nitrogen and the balance arc inert gas plus normal impurities.

2. The process of claim 1 wherein the nitrogen content is about 5% by volume and the inert gas is argon.

3. The process of claim 1 wherein the superalloy consists essentially of, in percent by weight, chromium 8 to 22, molybdenum plus tungsten up to 20, aluminum up to 6, titanium up to 1, Ta, Cb, Mn and Si up to 8 total, boron up to 0.05, zirconium up to 0.3, boron plus zirconium, 0.005 minimum, rare earths plus lanthanum up to 0.5, cobalt up to 40, yttrium up to 0.1, iron up to 36, carbon up to 0.5, balance nickel plus impurities.

4. An improved process for welding nickel-base superalloys in which a shielding gas surrounds an electric arc during welding, wherein the improvement comprises mixing nitrogen and inert gas to provide a shielding gas consisting essentially of about 2 to 8 percent nitrogen and the balance inert gas plus usual impurities and flowing said shielding gas to said arc during welding.

5. The process of claim 7 wherein nitrogen is about 5% by volume and the inert gas is argon.

6. The process of claim 4 wherein said nickel base superalloy contains at least one of boron and zirconium but less than about one weight percent titanium.

7. A process for reducing hot cracking in arc welded structures made from at least one nickel base alloy containing boron or zirconium comprising the steps of mixing about 2 to 8 volume percent nitrogen with argon gas and then useing the resulting mixture to shield the arc during welding.

* * * * *